US009333571B2

(12) United States Patent
Donnerdal et al.

(10) Patent No.: US 9,333,571 B2
(45) Date of Patent: May 10, 2016

(54) TOOL UNIT AND TOOL FOR A CUTTING OR SAWING MACHINE

(75) Inventors: Ove Donnerdal, Savedalen (SE); Hakan Pinzani, Gothenburg (SE)

(73) Assignee: HUSQVARNA AB, Huskvarna (SE)

( * ) Notice: Subject to any disclaimer, the term of this patent is extended or adjusted under 35 U.S.C. 154(b) by 664 days.

(21) Appl. No.: 13/516,657

(22) PCT Filed: Dec. 16, 2009

(86) PCT No.: PCT/SE2009/051433
§ 371 (c)(1),
(2), (4) Date: Aug. 27, 2012

(87) PCT Pub. No.: WO2011/075020
PCT Pub. Date: Jun. 23, 2011

(65) Prior Publication Data
US 2012/0304842 A1    Dec. 6, 2012

(51) Int. Cl.
*B23D 45/16*    (2006.01)
*B23D 45/00*    (2006.01)
*B23D 47/12*    (2006.01)

(52) U.S. Cl.
CPC ............ *B23D 45/165* (2013.01); *B23D 45/003* (2013.01); *B23D 47/12* (2013.01); *Y10T 83/9408* (2015.04)

(58) Field of Classification Search
CPC .... B26D 2001/0053; B28D 1/02; B28D 1/04; B28D 1/048; B28D 1/06; B28D 1/041; B28D 1/062; B28D 1/12; B28D 1/121; B27B 9/00; B27B 9/02; B27B 9/04; B23D 45/16; B23D 45/165; B23D 45/003; B23D 47/12
USPC ............... 83/663, 676, 678; 30/388, 389, 390
See application file for complete search history.

(56) References Cited

U.S. PATENT DOCUMENTS 4,646,607 A * 3/1987 Johansson ........................ 83/853
5,940,976 A * 8/1999 Soderqvist et al. ............. 30/390
(Continued)

FOREIGN PATENT DOCUMENTS

EP    0577579 A1    1/1994
EP    1733831 A1    12/2006
(Continued)

OTHER PUBLICATIONS

English Abstract for European Publication No. EP1733831, published Dec. 20, 2006, downloaded Jun. 11, 2012, 1 page.
(Continued)

*Primary Examiner* — Jason Daniel Prone
*Assistant Examiner* — Richard Crosby, Jr.
(74) *Attorney, Agent, or Firm* — Nelson Mullins Riley & Scarborough LLP

(57) ABSTRACT

A tool unit for a cutting or sawing machine with a tool carrier, including a first tool and a second tool. The first and second tool include a disk shaped cutting blade and a blade driving member. The first tool is secured to the second tool by means of a central clamping unit. Each blade driving member has a an aperture for attaching the first and second blade driving member together using the central clamping unit. The at least one disk shaped cutting blade has an at least partly recessed portion, adjacent to the aperture. The recessed portion is provided for attaching the disk shaped cutting blade to the corresponding blade driving member by holding the recessed portion axially between a main part and a blade supporting part of the corresponding blade driving member, ensuring an essentially flat outer extension plane of each tool.

29 Claims, 8 Drawing Sheets

(56) References Cited

U.S. PATENT DOCUMENTS

| | | | |
|---|---|---|---|
| 6,874,400 B2* | 4/2005 | Johansson | 83/877 |
| 7,143,759 B1* | 12/2006 | Wang | 125/13.01 |
| 7,144,194 B2* | 12/2006 | Kipp, Jr. | 404/112 |
| 7,571,720 B2* | 8/2009 | Donnerdal et al. | 125/13.01 |
| 8,272,134 B2* | 9/2012 | Soika et al. | 30/390 |
| 8,898,913 B1* | 12/2014 | Lones | 30/375 |
| 2001/0003983 A1* | 6/2001 | Iida et al. | 125/13.01 |
| 2002/0174913 A1* | 11/2002 | Johansson | 144/154.5 |
| 2003/0217743 A1* | 11/2003 | Gardner | 125/13.01 |
| 2004/0033852 A1* | 2/2004 | Taomo et al. | 474/101 |
| 2007/0221188 A1* | 9/2007 | Donnerdal et al. | 125/13.01 |
| 2009/0283286 A1* | 11/2009 | Hoffmann et al. | 173/215 |
| 2010/0299944 A1* | 12/2010 | Hellberg | 30/390 |

FOREIGN PATENT DOCUMENTS

| | | | |
|---|---|---|---|
| JP | 2000024932 A | 1/2000 | |
| JP | 2000263451 A | 9/2000 | |
| WO | 2006058898 A2 | 8/2006 | |
| WO | 2011075020 A1 | 6/2011 | |

OTHER PUBLICATIONS

English Abstract for Japanese Publication No. JP2000024932, published Jan. 25, 2000, downloaded Jun. 11, 2012, 2 pages.

English Abstract for Japanese Publication No. JP2000263451, published Sep. 26, 2000, downloaded Jun. 11, 2012, 2 pages.

English Abstract for WO Publication No. WO2006/058898, published Jun. 8, 2006, downloaded Jun. 11, 2012, 2 pages.

International Search Report for International Application No. PCT/SE2009/051433, dated Sep. 3, 2010, 5 pages.

Written Opinion for International Application No. PCT/SE2009/051433, dated Sep. 3, 2010, 5 pages.

* cited by examiner

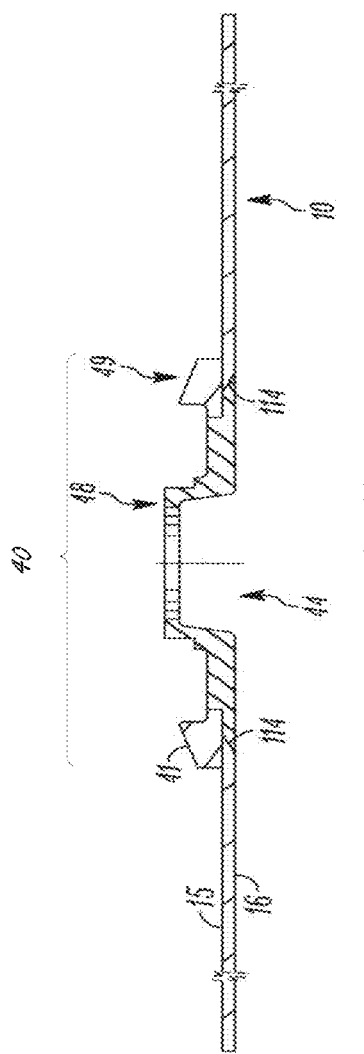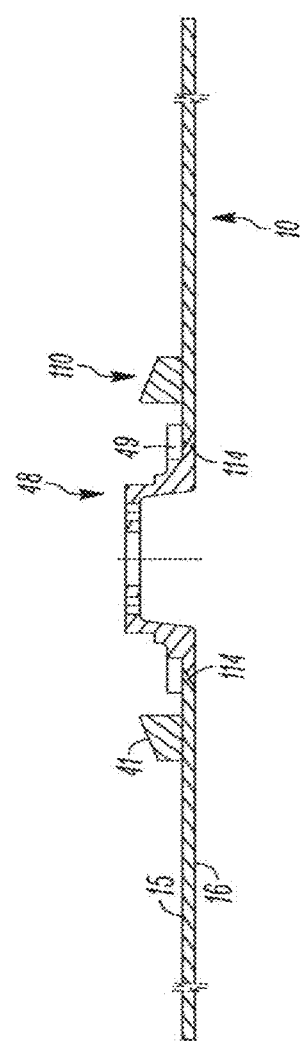

TOOL UNIT AND TOOL FOR A CUTTING OR SAWING MACHINE

CROSS-REFERENCE TO RELATED APPLICATIONS

This application is a national stage entry of PCT/SE2009/051433, which was filed on Dec. 16, 2009, said application is expressly incorporated herein in its entirety.

TECHNICAL FIELD

The present invention relates to a tool and a tool unit for a hand held cutting or sawing machine with a tool carrier enabling especially deep cuts, the tool comprising:
- a disk shaped cutting blade, having a central aperture defined by a central edge, and a peripheral cutting edge being the working part of the tool;
- a blade driving member, arranged to rotate together with the disk shaped cutting blade about an axis of rotation, wherein the blade driving member has a circumferential driving surface provided to be able to cooperate with an endless power transmission means, and wherein the blade driving member furthermore has a central attachment portion comprising at least one aperture for attaching the tool to an other similar tool, having a disk shaped cutting blade and a blade driving member,
thereby forming a tool unit with two cutting blades.

BACKGROUND OF THE INVENTION

A portable hand-held cutting and sawing machine according to above is capable of very deep cuts by using two disk shaped cutting blades located close to each other. The material between the two close cuts, typically concrete, will either brake by it self during the cutting operation or will be broken away by the machine operator. This special method is referred to as "Cut and Break" and is described in U.S. Pat. No. 7,571,720 issued on Aug. 11, 2005 assigned to Husqvarna AB, titled "Cutting or sawing machine", the disclosure of which is hereby incorporated by reference. This special method enables especially deep cuts, far deeper than the center of each cutting blade, like twice the diameter of the blades. Normally two cutting blades of the same size is used, but also one blade could be smaller. In a very special case it is possible to use a tool unit with only one cutting blade. The disk shaped cutting blades used are normally brazed to the corresponding blade driving members. Possibly they could be welded. The cutting blades are attached to flat annular surfaces of first and second driving members respectively, via brazed joints. The cutting blades are normally provided with outer segments comprising diamonds.

There is need to keep each cutting blade thin to keep each cut thin. Otherwise the power demand and thrust of the handheld machine would increase as well as the cost of the cutting blades. The cutting blade is manufactured from a specially high quality steel, e.g. hardened or cold rolled steel. However when the cutting blade is brazed there is a strong transmission of heat to the blade. The result is that the cutting blade looses a lot of its quality and strength. Therefore when subjected to hard cutting use it will lose some shape, not being fully flat any longer. The loss of shape will increase mechanical stress at the same time as the hardness and strength was already reduced by the heat of the brazing. There is also a stress concentration in the brazed or welded area of the disk where the thin blade is firmly connected to the thick driving member especially when the blade is prevented from heat expansion or bend. Further, the reliability of a welded joint along the welded area may not be ensured and minor defects may result in a failure of the welded joint. Cutting blades for a Cut-n-Break machine sometimes run under very difficult heat conditions as they are fully immersed in the material/concrete, so there is very little moving air available for air cooling. Instead cooling water supply is used, but can be forgotten or hindered. Brazing the disk shaped cutting blade and the corresponding blade driving member together tend to give high overall manufacturing cost for the tool.

In the light of the foregoing, there is a strong need for an improved tool unit and tool for this special type of cutting or sawing machines.

BRIEF DISCLOSURE OF THE INVENTION

It is an objective to solve or at least reduce the problems discussed above. In particular, the objective is to provide a resilient, robust and cost effective tool unit and tool for a cutting or sawing machine.

The objective is achieved with a novel tool unit for a cutting or sawing machine according to an example embodiment, and a tool according to claim 15. According to claim 1, the tool unit includes a first tool and a second part. The first tool includes a disk shaped cutting blade and a first blade driving member. The second part includes either a second blade driving member or a second tool. The second tool includes a disk shaped cutting blade and a second driving member. The first tool is secured to the second part by means of a central clamping unit. Each cutting blade has a central aperture defined by a central edge and a working part defined by a peripheral cutting edge of the cutting blade. The blade driving members are arranged to rotate together with the disk shaped cutting blade(s) about an axis of rotation. At least one of the driving members has a circumferential driving surface which configured to cooperate with an endless power transmission means. Each blade driving member has a central attachment portion which includes at least one aperture for attaching the first driving member to the second driving member via the central clamping unit. At least one of the disk shaped cutting blades has an at least partly recessed portion which is adjacent to the central aperture. The at least partly recessed portion is provided for attaching the disk shaped cutting blade to the corresponding blade driving member by holding the recessed portion axially between a main part and a blade supporting part of the corresponding blade driving member, ensuring an essentially flat outer extension plane of each tool. This results in a resilient attachment between the disk shaped cutting blade and the corresponding blade driving member without a brazed or welded joint between cutting blade and driving member. This brings a number of advantages. There is no strong heat transfer to the cutting blade during manufacture. It therefore keeps its quality and strength and is maintained fully flat even under difficult cutting conditions. Further it is held in a more resilient way, so that stress concentrations are mainly avoided. These advantages for the tool unit and the tool apply to many kind of saws, e.g. floor saws, wall saws possibly also tile saws and masonry saws. However the advantages are especially important for portable, hand held cutting or sawing machines.

According to some example embodiments, the at least partly recessed portion includes the central edge for connecting a first surface of the disk shaped cutting blade with a second surface of the disk shaped cutting blade. The central edge being beveled central edge.

According to an example embodiment, the at least partly recessed portion includes a first flanged collar segment which is bent out of a main extension plane of the disk shaped cutting blade. According to some example embodiments, the at least partly recessed portion further includes a second collar segment extending in a plane that is substantially parallel to the main extension plane of the disk shaped cutting blade. The second collar segment is arranged between the central edge of the disk shaped cutting blade and the first flanged collar segment. The first and second collar segments cause the beveled edge to rotate in the same direction as the axis of rotation. This results in a good fit between the disk shaped cutting blade and the corresponding blade driving member without any further processing of the beveled edge and lowering an associate manufacturing cost.

According to an example embodiment, at least one tool includes a drive arrangement arranged to prevent relative turning between a disk shaped cutting blade and its corresponding blade driving member. The drive arrangement includes complementary shaped first and second drive member/s. According to some example embodiments, the first drive member/s include protrusion/s extending from the central edge of the disk shaped cutting blade. The second drive member/s include recesses formed in the corresponding blade driving member such that the recess/es are configured to receive the protrusion/s. In an example embodiment, the first drive member/s are recess/es formed in the central edge of the disk shaped cutting blade. The recess/es are arranged to receive protrusion/s extending from the corresponding blade driving member.

According to some example embodiments, at least one of the blade driving members is supplied with a bearing receiving surface arranged to accommodate a bearing for rotatably connecting the tool unit to a tool carrier.

According to an example embodiment, at least one of the driving members includes a main part and a blade supporting part. At least a portion of the partly recessed part of the disk shaped blade is clamped between a portion of the blade supporting part and a portion of the main part. This results in a resilient mechanical attachment between the disk shaped cutting blade and the corresponding blade driving member, thereby eliminating the need for the brazed or welded joint between the cutting blade and the blade driving member.

According to some example embodiments, at least one main part includes a central attachment portion, a peripheral portion, and a bridging portion. The bridging portion interconnects the peripheral portion and the central attachment portion. According to an example embodiment, a circumferential driving surface is provided on the main part of the blade driving member. Alternatively, as disclosed in claim 12, the circumferential driving surface is provided on the blade supporting part of the blade driving member. In an example embodiment, the at least one of the circumferential driving surfaces is provided directly or indirectly on at least one of the cutting blades.

According to some example embodiments, the main part and the blade supporting part of at least one of the blade driving members are secured to each other by means of laser welded joint. This joint is located somewhat away from the blade driving member, so that only little heat reaches the blade driving member. Thus, a need for welding a whole interface between the disk shaped cutting blades and their corresponding blade driving members is removed.

In another example embodiment a tool for a cutting or a sawing machine with a tool carrier enabling especially deep cuts. The tool includes a disk shaped cutting blade and a blade driving member. The disk shaped cutting blade has a central aperture and a peripheral cutting edge which is the working part of the tool. The blade driving member is arranged to rotate together with the disk shaped cutting blade about an axis of rotation. The blade driving member includes a circumferential driving surface which is configured to cooperate with an endless power transmission means. The driving member also includes a central attachment portion having at least one aperture for attaching the tool to a second tool. The second tool includes another disk shaped cutting blade and a second driving member. The tool and the second tool together form a tool unit with two cutting blades. The disk shaped cutting blade has an at least partly recessed portion adjacent to the central aperture. The at least partly recessed portion is provided for attaching the disk shaped cutting blade to the blade driving member by holding the recessed portion axially between a main part and a blade supporting part of the corresponding blade driving member, ensuring an essentially flat outer extension plane of each tool.

According to some example embodiments, the at least partly recessed portion includes the central edge connecting a first surface of the disk shaped cutting blade with a second surface of the disk shaped cutting blade. The central edge being a beveled central edge.

According to an example embodiment, the at least partly recessed portion includes a first flanged collar segment which is bent out of the outer extension plane of the disk shaped cutting blade. According to some example embodiments, the at least partly recessed portion further includes a second collar segment extending in a plane that is substantially parallel to the outer extension plane of the disk shaped cutting blade. The second collar segment is arranged between the central edge of the disk shaped cutting blade and the first flanged collar segment. The first and second collar segments cause the central edge to rotate in the same direction as the axis of rotation.

According to an example embodiment, at least one tool includes a drive arrangement arranged to prevent relative turning between the disk shaped cutting blade and its corresponding blade driving member. The drive arrangement includes complementary shaped first and second drive member/s—one or more. According to some example embodiments, the first drive member/s include protrusions extending from the central edge of the disk shaped cutting blade. The second drive member/s include recess/es formed in the corresponding blade driving member such that the recess/es are configured to receive the protrusion/s.

In an example embodiment, the first drive member/s are recess/es formed in the central edge of the disk shaped cutting blade. The recess/es are arranged to receive protrusion/s extending from the corresponding blade driving member.

According to some example embodiments, the blade driving member is supplied with a bearing receiving surface arranged to accommodate a bearing for rotatably connecting the tool unit to a tool carrier.

According to an example embodiment the main part includes a central attachment portion, a peripheral portion, and a bridging portion. The bridging portion interconnects the peripheral portion and the central attachment portion. According to an example embodiment, the circumferential driving surface is provided on the main part of the blade driving member. Alternatively, as disclosed in some example embodiments, the circumferential driving surface is provided on the blade supporting part of the blade driving member. In an example embodiment the circumferential driving surface is provided directly or indirectly on the cutting blade.

According to an example embodiment, the main part and the blade supporting part of at least one of the blade driving members are secured to each other by means of laser welding.

According to some example embodiments the machine is a an held cutting or sawing machine, as the invention is especially advantageous for such a machine.

Other aspects, achievements and characteristic features of the invention are apparent from the appending claims and from the following description of preferred embodiments of the invention.

BRIEF DESCRIPTION OF THE DRAWINGS

In the following description of preferred embodiments, reference will be made to the accompanying drawings, in which.

FIG. 10 shows a detailed sectional view of a tool, according to a further embodiment of the present invention.

FIG. 11 shows a detailed sectional view of a tool, according to a still further embodiment of the present invention.

DESCRIPTION OF PREFERRED EMBODIMENTS

Figure 1:
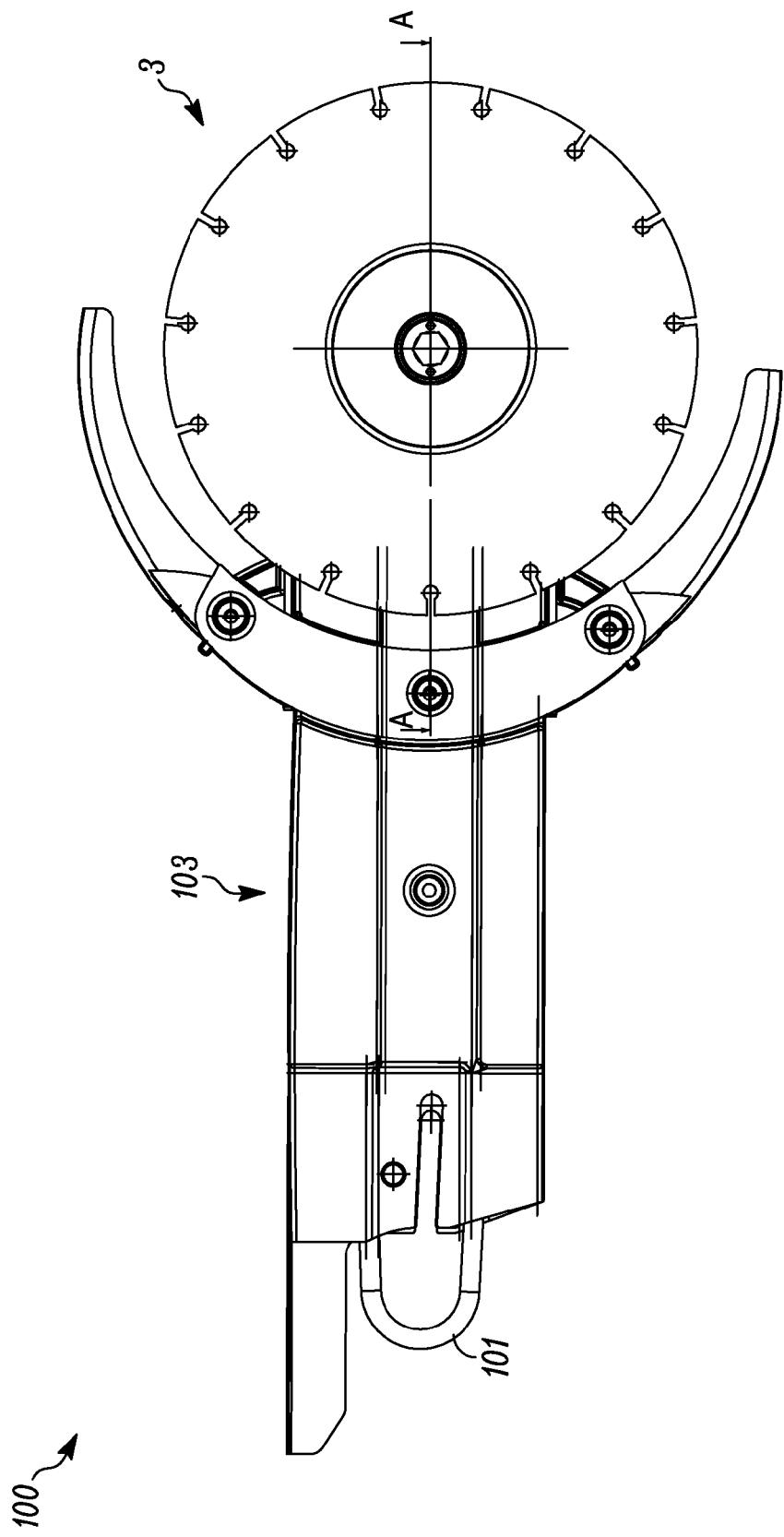
FIG. 1 shows a side elevation view of a tool unit held by a tool carrier of a cutting or sawing machine, according to an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be more thorough and complete, and will more fully convey the scope of the invention to those skilled in the art. For example, one or more aspects of the present invention can be utilized in other embodiments and even other types of devices. In the drawings, like numbers refer to like elements.

FIG. 1 shows a tool carrier 103 carrying a tool unit 3 of a special cutting or sawing machine, or cutter, incorporating some aspects of the present invention, and, may be incorporated in different types of embodiments.

The special cutting or sawing machine may be driven by, for example but not limiting to, an internal combustion engine (not shown in FIG. 1), an electric or pneumatic motor (not shown in FIG. 1), or the like. The tool unit 3 is rotatably connected to the tool carrier 103. Further, the cutter also includes one or more handles (not shown in FIG. 1) to permit a hand-held operation.

Figure 2:
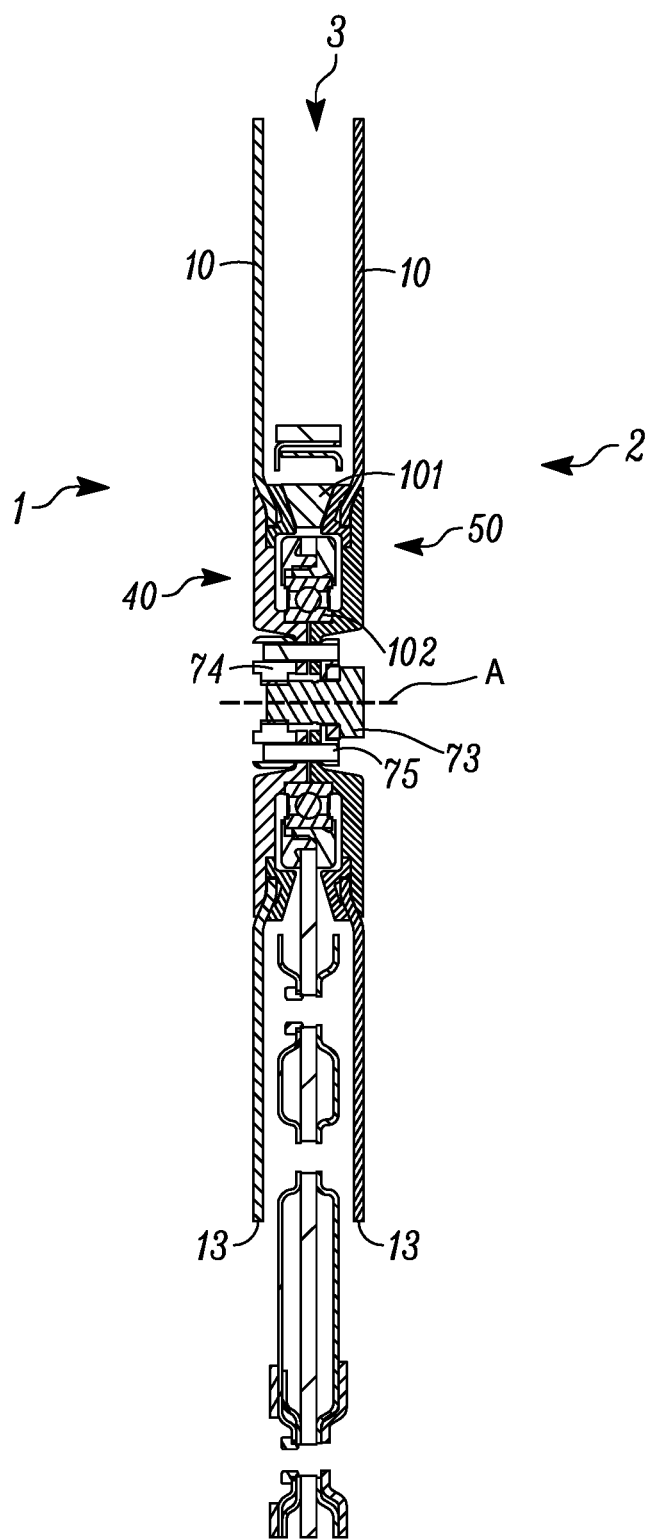
FIG. 2 shows a sectional view of the tool unit and tool carrier taken along a line A-A shown in FIG. 1.
Figure 3:
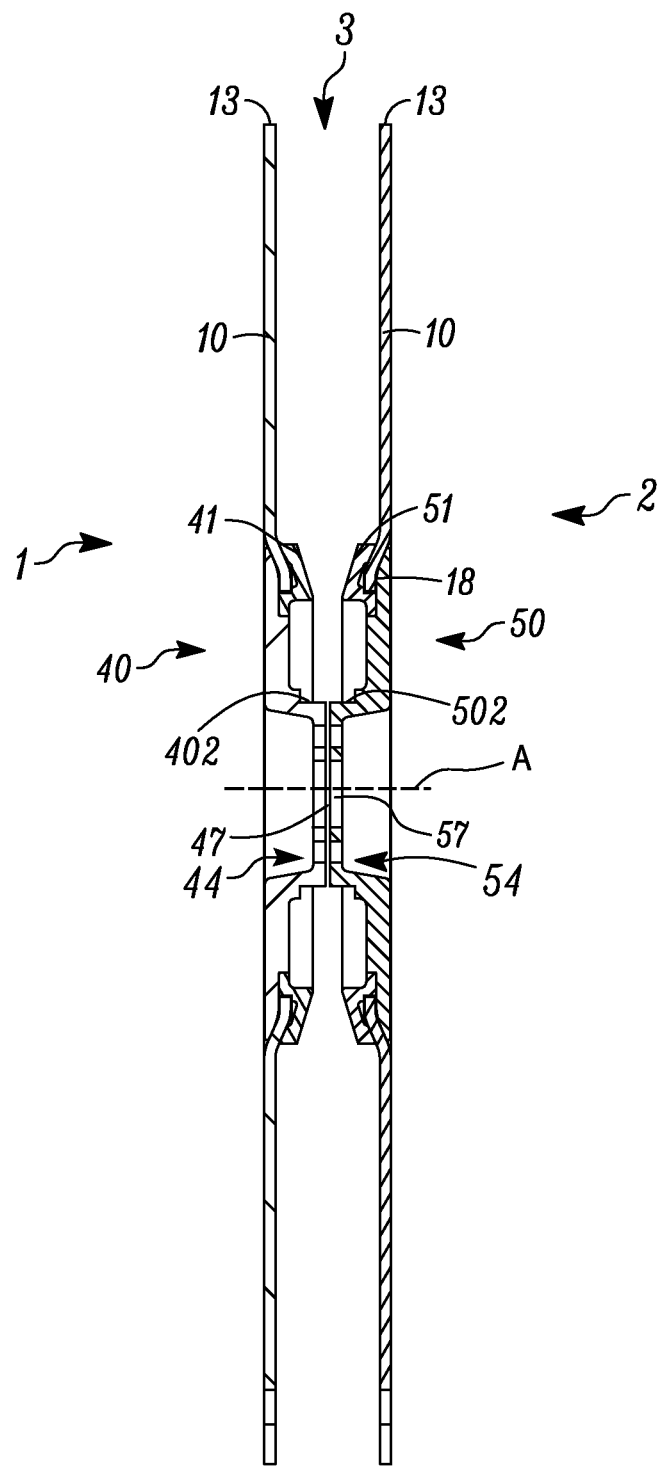
FIG. 3 shows a detailed sectional view of the tool unit taken along the line A-A shown in FIG. 1. For clarity reasons a central clamping unit shown in FIG. 1 is left out.

FIG. 2 is a sectional view of the tool unit 3 and tool carrier 103 along a line A-A shown in FIG. 1. FIG. 3 is detailed sectional view of the tool unit 3, but leaving out a central clamping unit 73, 74, 75 shown in FIG. 2. The tool unit 3 may include a first tool 1 and a second part. In an embodiment of the present invention, the first tool 1 may include a disk shaped cutting blade 10 and a first blade driving member 40. The disk shaped cutting blade 10 may be impregnated with diamond or any abrasive material to aid in cutting. Normally it is equipped with outer segments containing diamonds. These segments are well known by the skilled man and are not specifically shown in the figures. In a much used embodiment of the present invention, the second part includes a second tool 2. The second tool 2 includes a disk shaped cutting blade 10 and a second blade driving member 50. The second part is secured to the first tool by means of a central clamping unit. In an embodiment of the present invention, the central clamping unit may include clamping components 73, 74 and 75. It is apparent to a person ordinarily skilled in the art, that the central camping unit may be of a different configuration and the exemplary embodiment of a screw and nut configuration shown in FIG. 2 does not limit the scope of the present invention. Preferably a washer 75 with pins running through the two tools prevent the tools from turning in relation to each other. In an embodiment of the present invention, at least one of the blade driving members 40 or 50 may include bearing receiving surfaces 402 or 502 respectively (shown in FIG. 3), to accommodate a bearing 102 which rotatably connects the tool unit 3 to the tool carrier 103. The bearing 102 may include, for example but not limiting to, ball bearing, roller bearing, needle bearing, spherical bearing, tapered roller bearing, or the like.

As shown in FIG. 3, the blade driving members 40 and 50 are configured to rotate along with the disk shaped cutting blade 10 about an axis of rotation A. In an embodiment of the present invention, at least one of the driving members 40 or 50 may include circumferential driving surfaces 41 or 51 respectively. The circumferential driving surfaces 41 or 51 may be configured to cooperate with an endless power transmission means 101 (shown in FIG. 1), for example but not limiting to, a belt, a chain or the like. In an embodiment of the present invention, at least one of the blade driving members 40 and 50 may include central attachment portions 44 or 54 respectively. The central attachment portions 44 or 54 may include at least one aperture 47 or 57 respectively, for connecting the first driving member 40 to the second driving member 50 via the central clamping unit.

Figure 4:
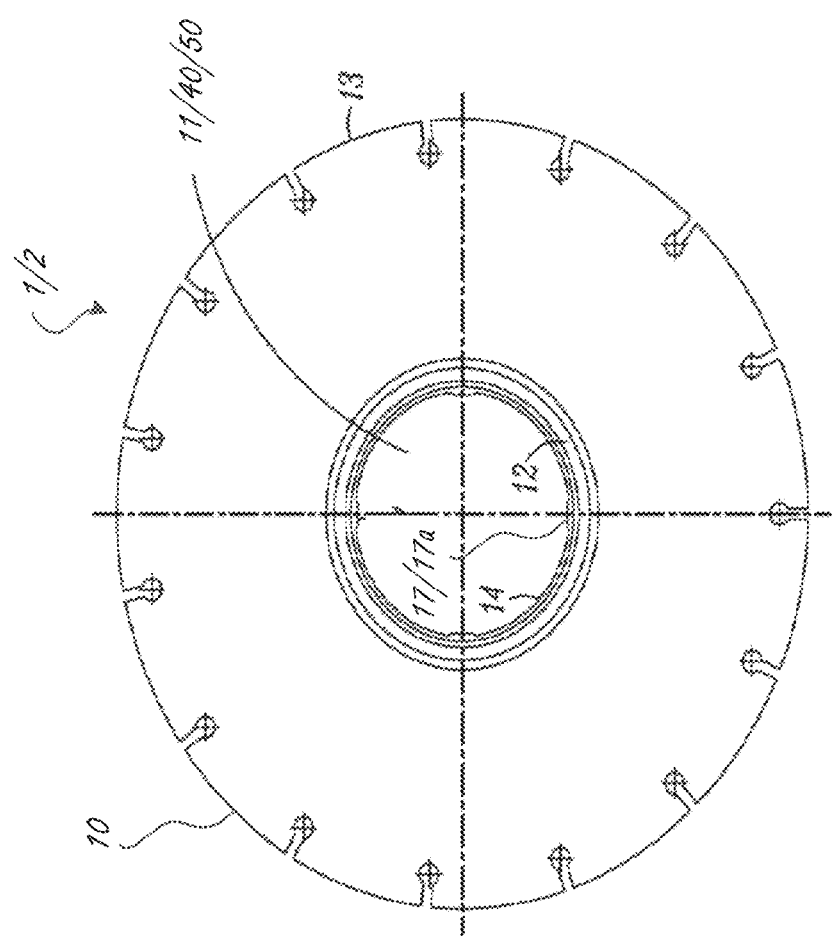
FIG. 4 shows a detailed side elevation view of a disk shaped cutting blade of a tool, according to an embodiment of the present invention.

As shown in FIG. 4, each disk shaped cutting blade 10 includes a central aperture 11 defined by a central edge 14 and a peripheral cutting edge 13. The peripheral edge 13 may be the working part of the corresponding tools 1 and 2. In an embodiment of the present invention, at least one of the disk shaped cutting blades 10 may include an at least partly recessed portion 12 which is adjacent to the central aperture 11. The at least partly recessed portion 12 may be provided for attaching at least one of the disk shaped cutting blades 10 to the corresponding blade driving members 40 or 50.

Figure 5:
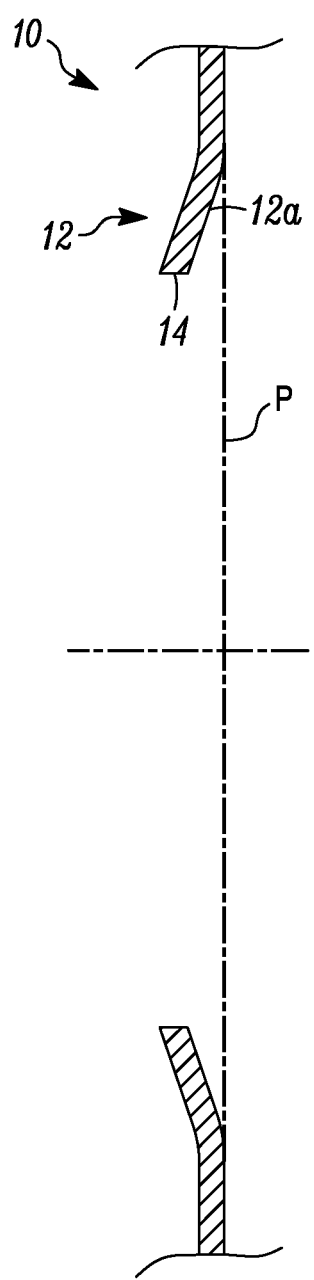
FIGS. 5 and 6 show detailed sectional views of a disk shaped cutting blade, according to various blade embodiments.
Figure 6:
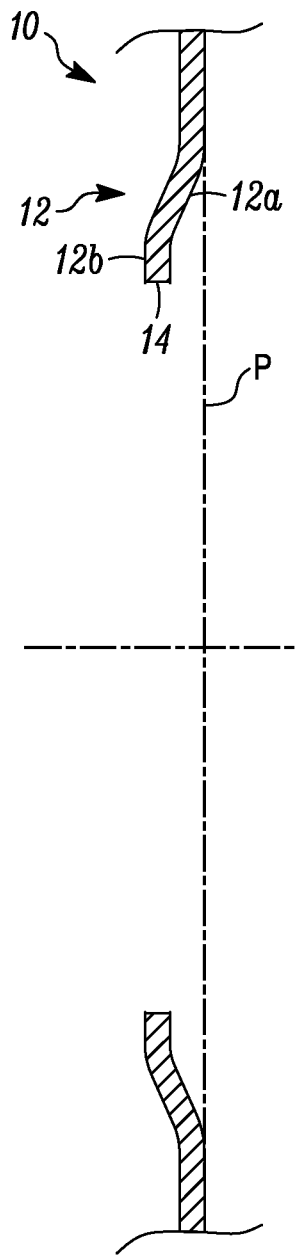

In an embodiment of the present invention, as shown in FIG. 5, the at least partly recessed portion 12 may include a first flanged collar segment 12a which is bent out of an outer extension plane P of the disk shaped cutting blade 10. The cutting blade often has diamond segments that have a slightly bigger thickness than the cutting blade blank, to which outer perimeter the segments are fastened. In this case the outer extension plane P of the cutting blade runs slightly outside of the plane of the blank. Preferably the blade driving members do not protrude outside of the extension plane of each blank. This creates a margin that reduces friction. The Cut-n-Break method requires the blade driving members to be inside the outer extension plane P of the tools. In another embodiment of the present invention, as shown in FIG. 6, the at least partly recessed portion 12 may further include a second collar segment 12b which extends in a plane that is substantially parallel to the outer extension plane P. Further, the second collar segment 12b may be arranged between the central edge 14 and the first flanged collar segment 12a. It is apparent to a person ordinarily skilled in the art, that the at least partly recessed portion 12 may include one or more collar segments in various configurations and the exemplary embodiments shown in FIGS. 5 and 6 does not limit the scope of the present invention.

In an embodiment of the present invention, as shown in FIGS. 3 and 4, at least one of the tools 1 or 2 may include a drive arrangement which is configured to prevent a relative turning between at least one of the disk shaped cutting blades 10 and its blade driving members 40 or 50. The drive arrangement may include complementary shaped first and second drive member/s respectively—one or more. As shown in FIG. 4, the first drive member 17 may include protrusion/s extending from the central edge 14 of at least one of the disk shaped cutting blades 10. The second drive member/s 17a may include recess/es formed in the corresponding drive members 40 or 50. The recess/es may be arranged to receive the protrusion/s. In another embodiment of the present invention, the first drive member/s 17 may be recess/es (not shown in the figures) formed in the central edge 14 of at least one of the disk shaped cutting blades 10. The recess/es may be arranged to receive protrusion/s (not shown in the figures) extending from the corresponding blade driving members 40 or 50.

Figure 7:
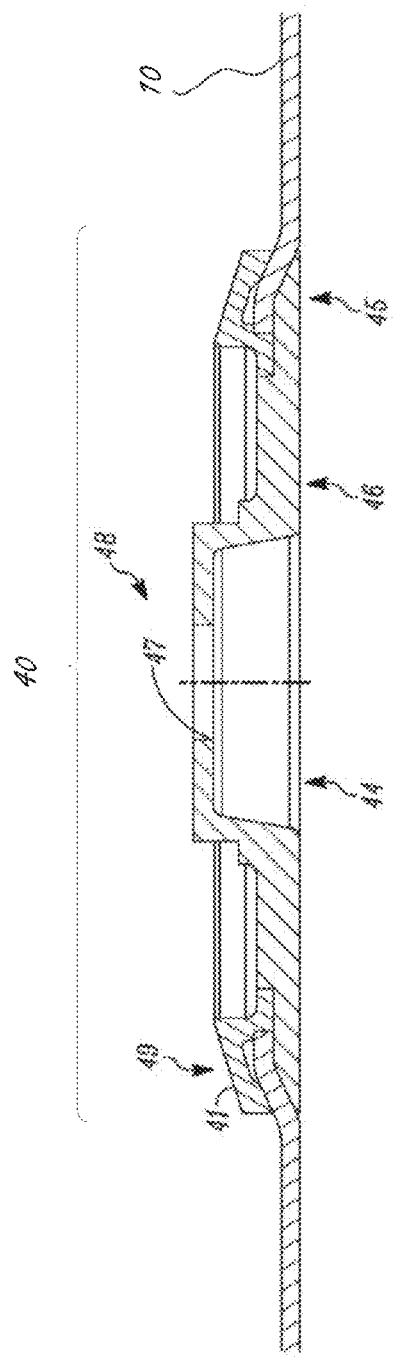
FIG. 7 shows a sectional view of a tool similar to the tools of FIG. 3.

FIG. 7 shows a sectional view of the tool 1 with details of the drive member 40. The drive member 40 is shown for illustrative purposes and the details shown in FIG. 7 may be applicable to any of the drive members 40 or 50. Parts of the drive member 50 are not shown separately and may be assumed to be substantially similar to equivalent parts of the drive member 40. At least one of the drive members 40 or 50 may include main parts 48 or 58 and blade supporting parts 49. In an embodiment of the present invention, at least one of the blade supporting parts 49 may be in the form of an annular ring. However, other shapes of the blade supporting parts 49 may be possible without departing from the essence of the present invention. In an embodiment of the present invention, at least one the main parts 48 or 58 and the corresponding blade supporting part 49 may be arranged such that at least a portion of the partly recessed portion 12 is clamped between a portion of the blade supporting part 49 and a portion of the main parts 48 or 58.

In another embodiment of the present invention, the main parts 48 or 58 may be secured to the blade supporting parts 49 by means of laser welding. Other means of securing is press fit and/or gluing, screwing, riveting. The laser welding may utilize any suitable type of laser, for example but not limiting to, solid-state laser, liquid laser, gas laser, or the like. Any suitable automated or manual equipment may be used to carry out the laser welding. At least one of the main parts 48 or 58 may include the central attachment portions 44 or 54, peripheral portions 45 or 55, and bridging portions 46 or 56 respectively. The bridging portions 46 or 56 may connect the peripheral portions 45 or 55 to the corresponding central attachment portions 44 or 54. The drive member 40, which is shown in the example embodiment of FIG. 7, is for illustrative purposes only and the drive members 40 or 50 may be of any different configuration without departing from the essence of the invention.

Figure 8:
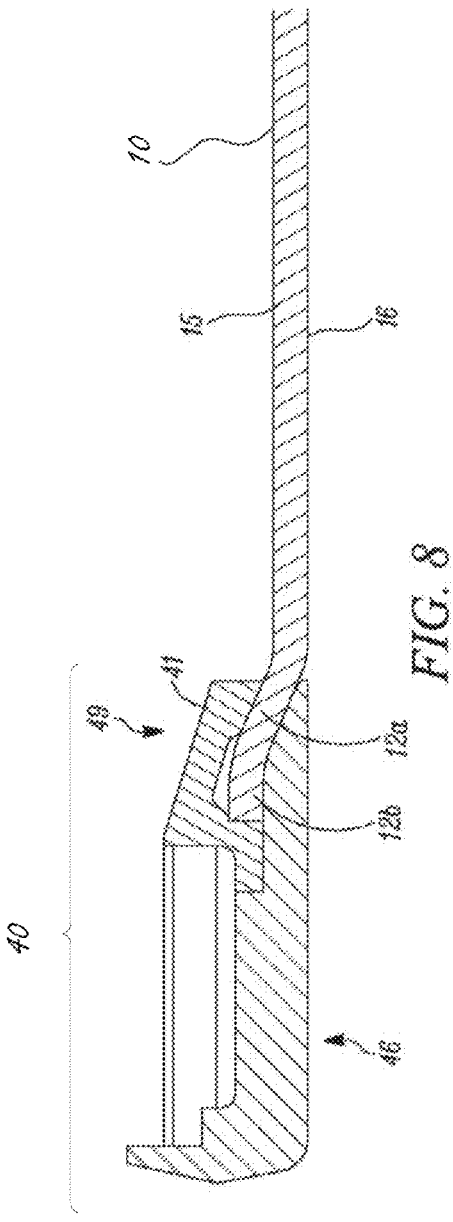
FIG. 8 shows a detailed sectional view of the tool in FIG. 7.
Figure 9:
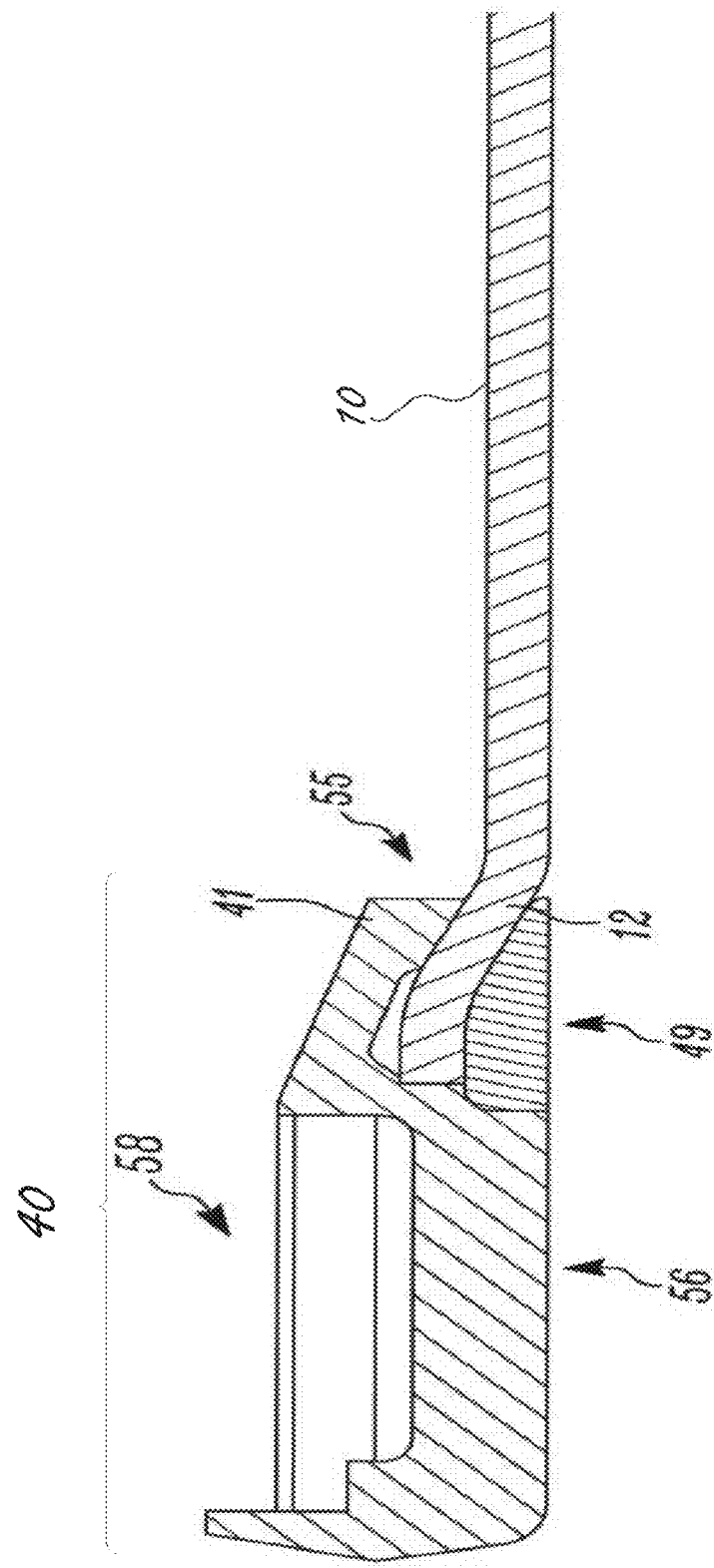
FIG. 9 shows a detailed sectional view of a tool, according to an embodiment of the present invention.

FIGS. 8 and 9 show sectional views of the tool with details of the drive member 40 and the disk shaped cutting blade 10. As previously stated, parts of the drive member 50 are not shown separately and may be assumed to be substantially similar to equivalent parts of the drive member 40. As shown in FIG. 8, a first surface 15 and a second surface 16 of at least one of the disk shaped cutting blades 10 may be connected with each other via the central edge 14 of the at least partly recessed portion 12. In an embodiment of the present invention, the central edge 14 may be a bevelled edge as shown in FIGS. 10 and 11. In another embodiment of the present invention, the circumferential driving surface 41 or 51 may be provided on the blade supporting part 49. In another embodiment of the present invention, as shown in FIG. 9, the circumferential driving surface 41 or 51 may be provided on the main parts 48 or 58 respectively.

FIG. 10 shows a sectional view of the tool with details of the blade driving member 40 and a disk shaped cutting blade 10 having a beveled central edge 114. The blade 10 is mounted longitudinally from above, and is locked by the blade supporting part 49. In this embodiment, the circumferential driving surface 41 or 51 is provided on the blade supporting part 49. In another embodiment according to FIG. 11 the blade supporting part 49 is instead a separate ring. It covers the beveled central edge 114. The circumferential driving surface 41 or 51 is instead formed on a separate driving ring 110, which is attached to the disk shaped cutting blade 10 via suitable joining process, for example but not limiting to, spot welding, welding, soldering, crimping, adhesives, brazing or the like, or by mechanical fasteners, such as bolts, rivets, clamps etc. The circumferential driving surfaces 41 or 51 may also be integrally formed with the disk shaped cutting blade 10, e.g. by forming. (not shown) This special main part 48 does therefore not comprise a bridging portion.

In the drawings and specification, there have been disclosed preferred embodiments and examples of the invention and, although specific terms are employed, they are used in a generic and descriptive sense only.

What is claimed is:

1. A tool unit for a cutting or sawing machine with a tool carrier enabling especially deep cuts, the tool unit comprising:
   a first tool comprising a disk shaped cutting blade and a first blade driving member; and
   a second part, which second part comprises either a second blade driving member, or a second tool comprising a disk shaped cutting blade and a second blade driving member;
   wherein the first tool is secured to the second part by means of a central clamping unit,
   wherein each disk shaped cutting blade, has a central aperture defined by a central edge, and a peripheral cutting edge, being the working part of the tool;
   wherein the blade driving members are arranged to rotate together with each disk shaped cutting blade about an axis of rotation;
   wherein at least one of the blade driving members has a circumferential driving surface provided to be able to cooperate with an endless power transmission means, and
   wherein each blade driving member has a central attachment portion comprising at least one aperture for attaching the first blade driving member to the second blade driving member by using the central clamping unit; and each disk shaped cutting blade has an at least partly recessed portion, adjacent to the central aperture, the at least partially recessed portion is provided for attaching each disk shaped cutting blade to the corresponding blade driving member by holding the at least partially recessed portion on opposing surfaces thereof between a main part and a blade supporting part of the corresponding blade driving member, ensuring a substantially flat outer extension plane of each tool.

2. The tool unit according to claim 1, wherein the at least partly recessed portion comprises the central edge, connecting a first surface of each disk shaped cutting blade with a second surface of each disk shaped cutting blade, this central edge being a beveled central edge.

3. The tool unit according to claim 1, wherein the at least partly recessed portion comprises a first flanged collar segment, which is bent out of a main extension plane of each disk shaped cutting blade.

4. The tool unit according to claim 3, wherein the at least partly recessed portion furthermore comprises a second collar segment extending in a plane that is substantially parallel to the main extension plane of each disk shaped cutting blade, which second collar segment is arranged between the central edge of each disk shaped cutting blade and the first flanged collar segment.

5. The tool unit according to claim 1, wherein at least one tool comprises a drive arrangement, arranged to prevent relative turning between a respective disk shaped cutting blade and a respective blade driving member, the drive arrangement comprising complementary shaped first and second drive member.

6. The tool unit according to claim 5, wherein the first drive member comprises a protrusion extending from the central edge of the respective disk shaped cutting blade, whereas the second drive member comprises a recess formed in the respective blade driving member, the recess being arranged to receive the protrusion.

7. The tool unit according to claim 5, wherein the first drive member is a recess formed in the central edge of the respective disk shaped cutting blade, which recess are arranged to receive a protrusion extending from the respective blade driving member.

8. The tool unit according to claim 1, wherein at least one of the blade driving members is supplied with a bearing receiving surface, arranged to accommodate a bearing for rotatably connecting the tool unit to the tool carrier.

9. The tool unit according to claim 1, wherein at least one of the blade driving members comprises:
a main part; and
a blade supporting part.

10. The tool unit according to claim 9, wherein the at least one main part comprises
a central attachment portion;
a peripheral portion;
a bridging portion, interconnecting the peripheral portion and the central attachment portion.

11. The tool unit according to claim 9, wherein the circumferential driving surface is provided on the main part of the blade driving member.

12. The tool unit according to claim 9, wherein the circumferential driving surface is provided on the blade supporting part of the at least one of the blade driving members.

13. The tool unit according to claim 1, wherein the at least one circumferential driving surface is provided directly or indirectly on each disk shaped cutting blade.

14. The tool unit according to claim 9, wherein the main part; and the blade supporting part of at least one of the blade driving members, are secured to each other by means of laser welding.

15. A tool for a cutting or sawing machine with a tool carrier enabling especially deep cuts, the tool comprising:

a first disk shaped cutting blade, having a central aperture defined by a central edge, and a peripheral cutting edge being the working part of the tool;
a blade driving member, arranged to rotate together with the disk shaped cutting blade about an axis of rotation,
wherein the blade driving member has a circumferential driving surface provided to be able to cooperate with an endless power transmission means,
wherein the blade driving member furthermore has a central attachment portion comprising at least one aperture for attaching the tool to another similar tool, having a second disk shaped cutting blade and a blade driving member, thereby forming a tool unit with two cutting blades, and
wherein each of the disk shaped cutting blades has an at least partly recessed portion, adjacent to the central aperture, which the at least partially recessed portion is provided for attaching each of the first and second disk shaped cutting-blades to a corresponding blade driving member by holding the at least partially recessed portion on opposing surfaces thereof between a main part and a blade supporting part of the corresponding blade driving member, ensuring a substantially flat outer extension plane of the tool.

16. The tool according to claim 14, wherein the at least partly recessed portion comprises the central edge, connecting a first surface of each of the first and second disk shaped cutting-blades with a second surface of the cutting blade, the central edge being a beveled central edge.

17. The tool according to claim 15, wherein the at least partly recessed portion comprises a first flanged collar segment, which is bent out of the outer extension plane of each of the first and second disk shaped cutting blades.

18. The tool according to claim 17, wherein the at least partly recessed portion furthermore comprises a second collar segment extending in a plane that is substantially parallel to the outer extension plane of the disk shaped cutting blade, which second collar segment is arranged between the central edge of each of the first and second disk shaped cutting-blades and the first flanged collar segment.

19. The tool according to claim 15, wherein the tool comprises a drive arrangement, arranged to prevent relative turning between each of the first and second disk shaped cutting-blades and the corresponding blade driving member, the drive arrangement comprising complementary shaped first and second drive member.

20. The tool according to claim 19, wherein the first drive member comprises protrusions extending from the central edge of each of the first and second disk shaped cutting-blades, whereas the second drive member comprises recess formed in the corresponding blade driving member, the recess being arranged to receive the protrusions.

21. The tool according to claim 19, wherein the first drive member are recess formed in the central edge of each of the first and second disk shaped cutting-blades, which recess are arranged to receive protrusions extending from the corresponding blade driving member.

22. The tool according to claim 15, wherein at least one of the blade driving members is supplied with a bearing receiving surface, arranged to accommodate a bearing for rotatably connecting the tool to a tool carrier.

23. The tool according to claim 15, wherein the main part comprises a central attachment portion;
a peripheral portion;
a bridging portion, interconnecting the peripheral portion and the central attachment portion.

24. The tool according to claim 15, wherein the circumferential driving surface is provided on the main part of each of the blade driving members.

25. The tool according to claim 15, wherein the circumferential driving surface is provided on the blade supporting part of each of the blade driving members.

26. The tool according to claim 15, wherein the circumferential driving surface is provided directly or indirectly on each of the first and second disk shaped cutting blades.

27. The tool according to claim 15, wherein the main part; and the blade supporting part of each of the blade driving members, are secured to each other by means of laser welding.

28. The tool unit according to claim 1, wherein the machine is a hand held cutting or sawing machine.

29. The tool according to claim 15, wherein the machine is a hand held cutting or sawing machine.

* * * * *